Nov. 7, 1933.  S. B. HENDRICKS  1,933,906
CULTIVATOR
Filed Dec. 1, 1932   3 Sheets-Sheet 1
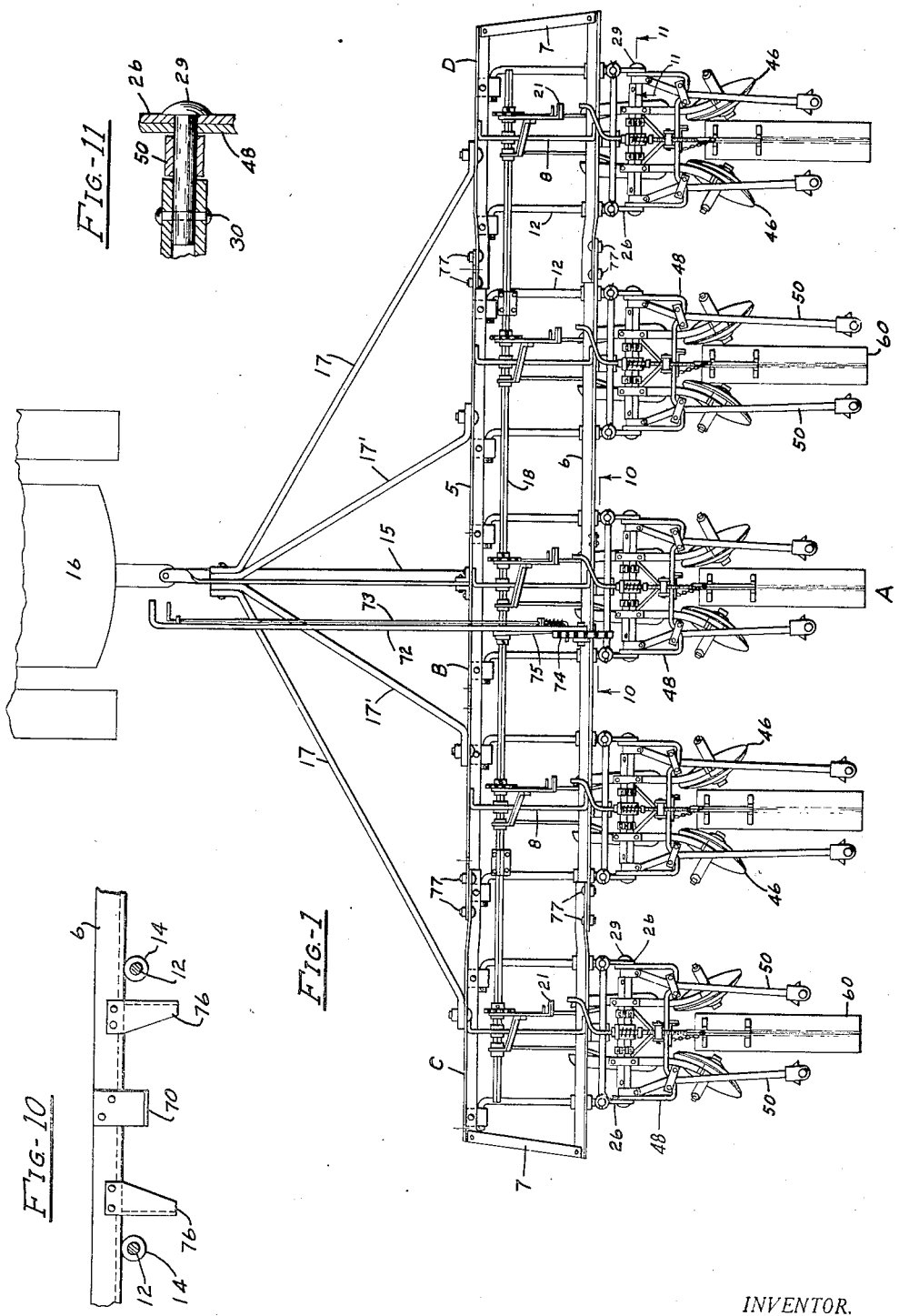
INVENTOR.
SIMEON B. HENDRICKS
BY James A. Walsh,
ATTORNEY Nov. 7, 1933.    S. B. HENDRICKS    1,933,906
CULTIVATOR
Filed Dec. 1, 1932    3 Sheets-Sheet 2
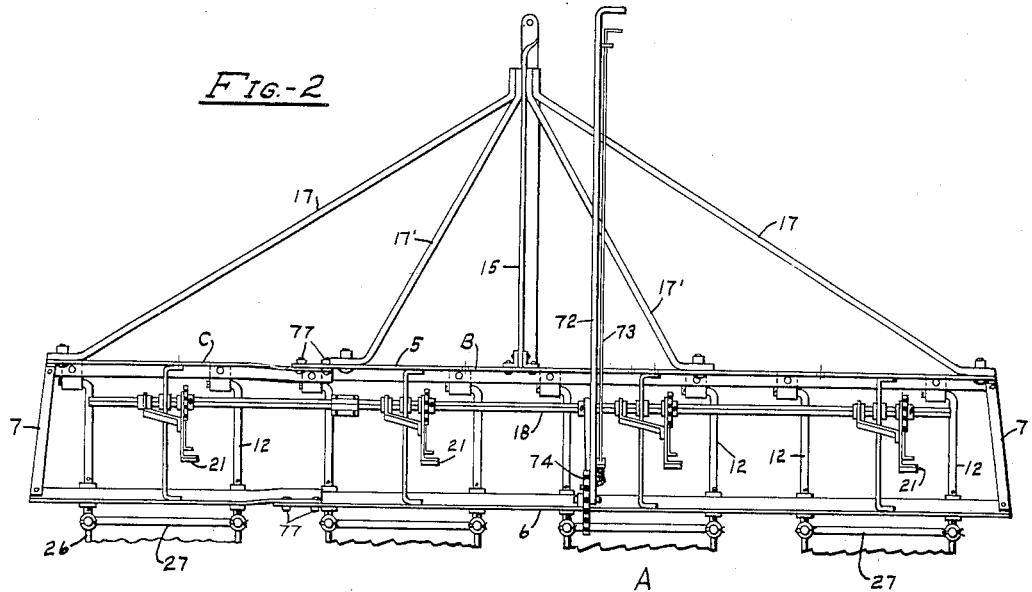
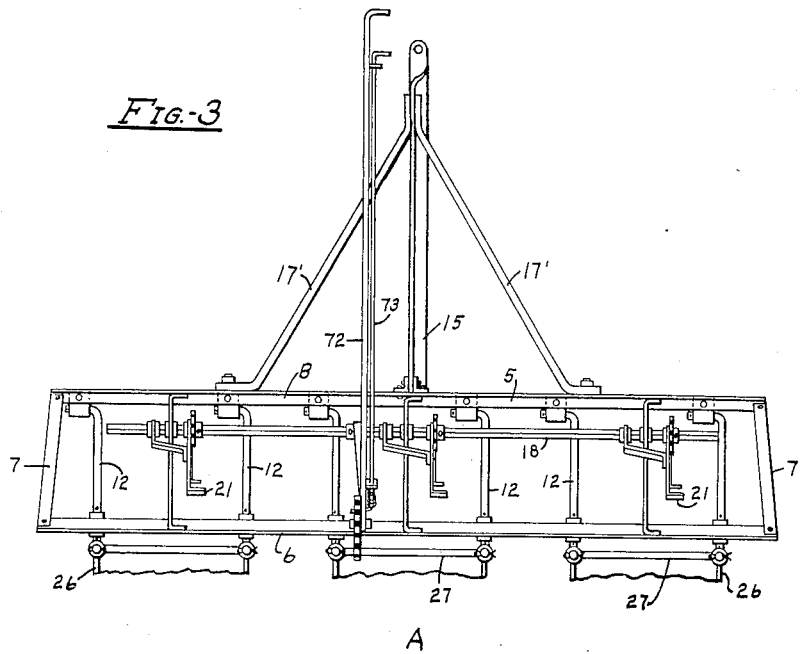
INVENTOR.
SIMEON B. HENDRICKS
BY James A. Walsh
ATTORNEY Nov. 7, 1933.  S. B. HENDRICKS  1,933,906
CULTIVATOR
Filed Dec. 1, 1932   3 Sheets-Sheet 3
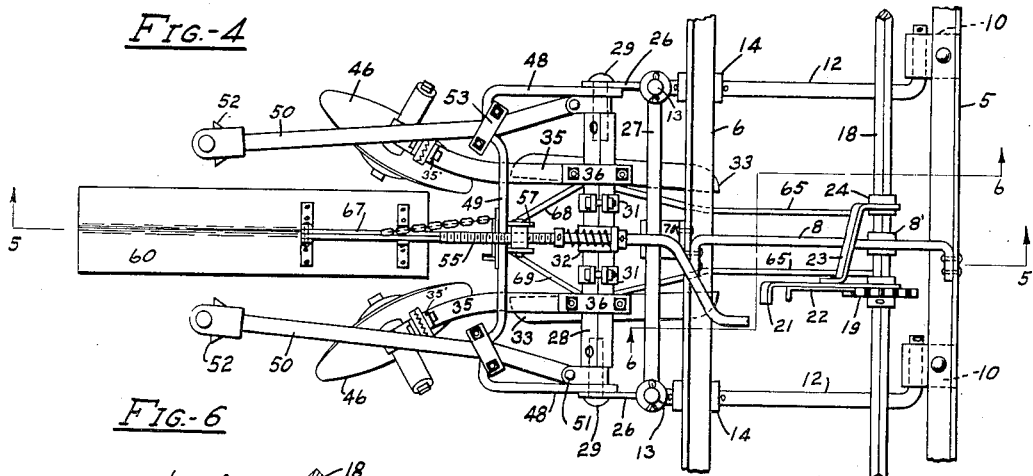
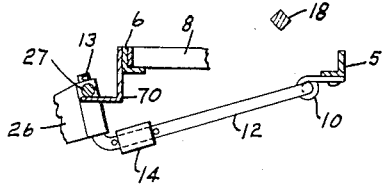
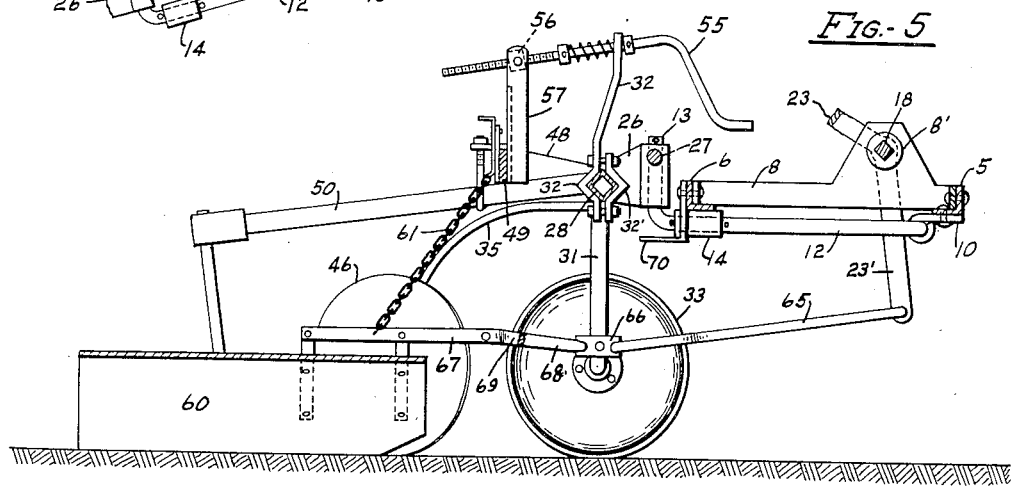
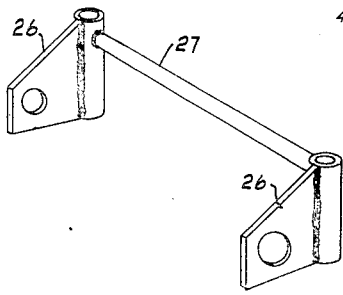
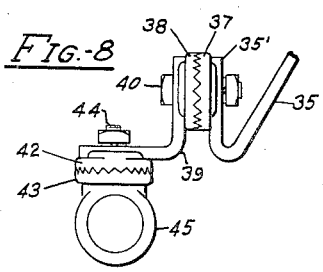
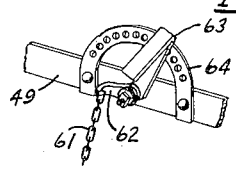
INVENTOR.
SIMEON B. HENDRICKS
BY James A. Walsh
ATTORNEY Patented Nov. 7, 1933

1,933,906

UNITED STATES PATENT OFFICE 1,933,906

CULTIVATOR

Simeon B. Hendricks, Rockford, Ill., assignor to J. I. Case Company, Racine, Wis., a corporation Application December 1, 1932. Serial No. 645,225

5 Claims. (Cl. 97—143)

The object of my invention is to provide a multiple gang lister cultivator which may be readily converted into a greater or lesser number of gangs to adapt the implement for cultivating varying widths of land rows, and the gangs of which can be adjusted individually or collectively as desired, the implement being designed especially to be tractor drawn but other means may be employed for the purpose.

In the accompanying drawings, forming part hereof, Figure 1 is a plan view of a lister cultivator embodying my improvements and composed of five gangs; Figs. 2 and 3, plan views showing the implement reduced to four and three gangs capacity, respectively; Fig. 4, a plan view of one of the gangs comprising a number of earth working tools; Fig. 5, a side elevation of a single gang, taken on the dotted line 5—5 in Fig. 4; Fig. 6, a detail section taken on the dotted lines 6—6 in Fig. 4; Figs. 7, 8 and 9, certain details of construction to be hereinafter specifically referred to; Fig. 10, a fragmentary plan of the rear frame member provided with stops to limit the vertical and lateral movements of the center or rudder gang, and taken on the dotted line 10—10 in Fig. 1; and Fig. 11, a detail section of a supporting shaft and its pivotal connection forming part of a gang structure taken on the dotted line 11—11 in Fig. 1.

In said drawings the numerals 5 and 6 indicate frame members preferably composed of angle-iron and the ends of which are connected by brace members 7 secured to said members, the frame structure being further braced by tie-rods 8.

As the gang structures are counterparts of substantially the construction and arrangement shown in Fig. 4 it will suffice to describe but one of them in detail. Upon the frame 5, as shown in Fig. 4, bearings 10 are pivotally mounted to swing horizontally, and in which bearings are pivotally mounted connecting rods 12, two for each gang, which are provided adjacent their rear vertical ends 13 with rollers 14 adapted to ride under and against the frame 6 when said rods move laterally. The frame is provided with a drawbar 15 adapted to be connected with a tractor 16 and which frame and drawbar are braced by a system of detachable rods 17, 17', substantially as indicated in Fig. 1.

The tie-rod 8 is provided with bearings 8' in which a preferably square shaft 18 is mounted to rock, and which shaft also passes through a quadrant 19 connected to said rock-shaft 18, Fig. 4. A lever 21 is also mounted on shaft 18 having a detent 22 for engaging the quadrant, as is common, said lever being further connected to the shaft by a brace 23 connected to a bearing 24 on shaft 18, and which brace has a depending vertical extension 23', Fig. 5, for a purpose to appear. Upon the vertical ends 13 of the connecting rods 12, I pivotally mount brackets 26 which are rigidly connected by a tie-bar 27, and in which brackets a square shaft 28 is mounted by means of studs 29 secured thereto by rivets 30, Fig. 11, and to which shaft 28 standards 31 are fixedly secured by suitable clamps 32, 32', the lower ends of the standards having carrying wheels 33 mounted thereon. Also fixedly secured to said shaft 28 are disk beams 35, the upper ends of which are preferably bent around the shaft and secured thereto by clamps 36, as indicated in Fig. 4. Said disk beams, Fig. 8, are upturned at their lower ends 35' and each of which supports a vertical clutch member 37 engaging a similar clutch member 38 on the beam extension 39, said members being adjustably connected by a bolt 40, and the outer end of the beam extension 39 is also provided with a horizontal clutch 42 engaging a like clutch 43 adjustably secured thereto by a bolt 44, which member 43 includes a bearing 45 for a disk 46. The adjustable vertical and horizontal clutch members thus described it will be understood enable the operator to angle the disk in any desired manner by loosening one or both bolts and then maintaining the disk in adjusted position by retightening the bolts. Upon studs 29, I pivotally mount a supplemental frame 48 having a transverse member 49, and also upon said studs drag-beams 50 are pivotally mounted, at 51, to swing horizontally, and which beams carry cultivator shovels 52 and are adjustably connected to the supplemental frame by keepers 53 to permit setting of the shovels for different widths of cultivation. As indicated in Fig. 5, bracket 32 is secured to square shaft 28 by keeper 32' and extended to form a support for a yieldingly mounted threaded adjusting shaft 55 trunnioned at 56 in a standard 57 supported on the supplemental frame 48, and by the manipulation of which shaft said frame may be raised and lowered to vertically adjust the cultivator beams 50. Between the disks 46 and drag-beams 50 a plant shield 60 is positioned in trailing relation to the gang and suspended from the supplemental frame member 49 by a chain or equivalent flexible device 61 attached to a hook 62 which is raised and lowered to vertically adjust the shield by a detent 63 adapted to engage a quadrant 64 as desired. To the brace extension 23' an adjusting rod 65 is pivotally connected, Fig. 5, and at its opposite end is pivoted to a bearing 66 on standard 31, and to which bearing a shield-beam 67 is also connected and attached to said shield as will appear. Likewise the lever 21 has a downward extension (not shown) to which a similar adjusting rod 65' is pivotally connected, Fig. 4, and at its opposite end is pivoted to a bearing similar to 66, while brace-rods 68, 69, are secured on said bearings 66 and converge toward and are connected to the shield-beam 67, by which rods the shield is maintained from contact with the disks 46.

From the foregoing description it will be understood that by manipulating adjusting shaft 55 the height of the frame 48 can be regulated to position the cultivator shovels 52 in the desired relation to the land, while at the same time through the rocking of shaft 28 carrying the disk-beams 35 the latter will be adjusted correspondingly with the cultivator beams, and that by manipulating lever 21 the gang in entirety may be raised and lowered as desired through the tilting action of the frame 48 about the pivot points 29 in brackets 26, during which action the adjusting rods 65, 65', wheels 33 and shield 60 will be moved rearwardly and upwardly in unison with the movement of the cultivator and disk beams. It will also be understood that when one or more of the gangs encounter depressions means should be provided to prevent the tools from entering therein to become broken or damaged, for which purpose I provide the stop 70 on frame 6, Fig. 6, so that as the gang descends the tie-bar 27 will engage the stop and thus sustain the gang from further downward movement in relation to the ground.

In pivotally securing conecting rods 12 by the horizontally pivoted bearings 10, and pivotally associating the cultivator beams 50 and disk beams 35 with the rock-shaft 28 which is pivotally connected to the brackets 26 and the supplemental frame 48, it will be seen that a flexible gang is provided capable of various vertical adjustments, and which also by its pivotal connection 10 and rollers 14 will yield laterally to a limited extent as the gang encounters ground irregularities, and that each gang may be individually adjusted by means of its lever 21. It will be further understood that the middle or rudder gang A, Fig. 1, is in the main a counterpart of the outer gangs and operable individually in like manner, but in addition to the adjusting device disclosed I associate therewith means for limiting lateral movement of said gang consisting of stops 76 secured to frame 6, Fig. 10. A centrally located master lever 72 is pivotally connected to frame member 6 and by its detent 73 engaging a quadrant 74 secured to frame 6. Said lever is connected to rock-shaft 18 by links 75, so that when simultaneous vertical adjustments of the gangs collectively is required all of the gangs may be thus raised and lowered by the manipulation of this lever, the lateral movement of gang A being limited by the stops 76, Fig. 10, on frame 6. The implement is balanced on its wheels 33 so that when the master lever is released the power pulling the implement forwardly automatically swings the cultivator units upwardly without effort on the part of the operator.

In Fig. 1 is shown a five gang cultivator comprising a main frame section B and the outer sections C and D, which latter are detachably secured thereto by bolts 77 or otherwise, and all of which are braced with the drawbar 15 by the rods 17, 17'. When it is desired to convert the structure into a four gang cultivator one of the outer sections is removed, as D for example, indicated in Fig. 2. The braces and drawbar are then detached and reconnected in holes provided therefor in the vertical web of frame member 5, so that the ends of the main frame B and section C will lie equidistant from the drawbar, as shown in Fig. 2, when the implement will be converted into a four gang cultivator; and by removing both the sections C and D and the braces 17 a three gang cultivator is provided, as indicated in Fig. 3. It will therefore be understood that in a comparatively simple manner I am enabled to provide a multiple gang cultivator or similar implement readily convertible into a greater or lesser number of gangs without the addition of detail parts other than those initially comprised in a cultivator as shown in Fig. 1, and that a cultivator of the capacity shown in Fig. 3 comprising three gangs may be increased to a four or five gang implement by attaching additional gangs in the manner stated, and also that by removing the center gang the implement, Fig. 3, may be converted into a two-gang cultivator.

I claim as my invention:

1. In a cultivator, a main frame, connecting rods pivotally secured to the frame and terminating in vertical bearings, connected brackets mounted on said bearings, a beam supporting shaft, beams secured to the shaft, a supplemental frame, means connecting said brackets and shaft, cultivator beams pivotally secured to said connecting means and supported by said supplemental frame, and means associated with the main frame for tilting the same to vertically adjust all of said beams.

2. In a cultivator, a main frame comprising forward and rear transverse members, a rockshaft mounted on the frame, connecting rods pivotally secured to the forward frame member to move vertically, rollers on said rods adapted to contact the rear frame member, connected brackets mounted on said rods, means on the frame to limit vertical movement of the rods, a supplemental frame means connecting the latter frame to the brackets, a shaft supported by said connecting means, disk beams mounted on the shaft, beams mounted on the connecting means and supported by the supplemental frame, and means on the rock-shaft for tilting the main frame to raise and lower the supplemental frame and the beams associated therewith.

3. In a cultivator, a main frame, a supplemental frame, a supporting shaft, means for connecting the shaft, supplemental and main frames, standards depending from said shaft, carrying wheels supported by the standards, cultivator beams pivotally mounted on said connecting means and supported by the supplemental frame, disk beams secured to the shaft, and adjusting means on said shaft for vertically adjusting said cultivator beams independently of the main frame.

4. In a cultivator, a main frame, connecting rods pivotally mounted on said frame to swing vertically and horizontally, rollers on the connecting rods adapted to ride along the frame as the rods move laterally, brackets on said connecting rods, means for connecting the brackets, means on the main frame adapted to engage the bracket connecting means for limiting vertical movement of the connecting rods, vertically movable beam supporting means connected to the brackets, and means for vertically adjusting said latter means to regulate the height of the beams.

5. In a cultivator, a main frame, connecting rods pivotally secured to the frame, brackets on the connecting rods, transverse means connecting the brackets, a supplemental frame, a shaft, studs connecting the brackets, supplemental frame and shaft, cultivator beams mounted on the studs, disk-beams connected to the shaft, and means on the main frame connected to the supplemental frame for vertically adjusting the latter and the parts associated therewith.

SIMEON B. HENDRICKS.